United States Patent [19]

Stone, Jr.

[11] 3,731,360

[45] May 8, 1973

[54] METHOD OF MAKING A COMPOSITE BLADE WITH AN INTEGRALLY ATTACHED ROOT THEREON

[75] Inventor: Hilton F. Stone, Jr., Glastonbury, Conn.

[73] Assignee: United Aircraft Corporation, East Hartford, Conn.

[22] Filed: Apr. 7, 1971

[21] Appl. No.: 131,967

[52] U.S. Cl..............29/156.8 B, 416/229, 416/248, 29/156.8 R
[51] Int. Cl...........................B23p 15/04, B21k 3/04
[58] Field of Search...................29/156.8 R, 156.8 B, 29/156.8 P, 156.8 H, 156.8 T, 486, 497.5, 498, 156.8 CF, 156.8 FC, 23.5; 156/282, 288, 242; 416/228, 229, 217, 241, 248

[56] References Cited
UNITED STATES PATENTS

| 2,749,029 | 6/1956 | Goetzel | 29/156.8 B |
| 2,754,570 | 7/1956 | Crawford | 29/156.8 B |
| 2,767,460 | 10/1956 | Schultz | 29/156.8 B |
| 2,856,675 | 10/1958 | Hansen | 29/156.8 B |
| 3,292,245 | 12/1966 | Pfau | 29/156.8 B |
| 3,132,841 | 5/1964 | Wilder | 416/229 |
| 3,664,764 | 5/1972 | Davies et al. | 416/248 |

Primary Examiner—Charles W. Lanham
Assistant Examiner—D. C. Crane
Attorney—Charles A. Warren

[57] ABSTRACT

A method of making a composite blade with an integral root thereon in a single compacting and bonding operation thereby to assure a secure attachment of the blocks to the fiber layers and the fiber layers together.

8 Claims, 5 Drawing Figures

PATENTED MAY 8 1973

3,731,360

INVENTOR
HILTON F. STONE, JR

BY Charles A. Warren

ATTORNEY

METHOD OF MAKING A COMPOSITE BLADE WITH AN INTEGRALLY ATTACHED ROOT THEREON

The present invention relates to a method of making a composite blade with an integral blade root.

BACKGROUND OF THE INVENTION

Blades of this type have been made by assembling together a plurality of plies of fibers together and then pressing them to completed dimension in cooperating bonding and heating dies and subsequently in a second bonding operation attaching the root blocks to the shaped composite. Not only does this require two operations which are time consuming since the heating of the blade for each operation and subsequent cooling before removal from the dies may take as much as 8 hours, but in addition with the blade shaped to finished dimension over the area to which the root blocks are to be later attached any deviation of the contacting surfaces of the blocks from a mating configuration with the composite material would prevent bonding contact over the entire area of each block with the resulting insecure attachment of the blocks to the blade.

SUMMARY OF THE INVENTION

The principal feature of the present invention is the method of bonding and compacting the composite fibers together and simultaneously bonding the root blocks to one end of the layers of fibers in a single pressing and bonding operation. Another feature is the added step of coining the root blocks to the finished dimension in the same operation. Another feature is the simultaneous bonding of a wedge between certain layers of fibers at the root ends to provide the desired blade supporting root configuration on the blade.

According to the present invention, the several plies are assembled together without compacting and the root blocks are placed in position on opposite sides of the assembled plies. The assemblage is then placed in cooperating dies which are heated and compacting pressure is applied to compact all the plies together to finished dimension and to press the blocks securely into contact with the assembly of plies. The heating and pressure causes a flow of the matrix to completely bond all the fibers of the plies together and to bond the blocks to the fibers in a single operation with a secure attachment of the blocks to the composite material. The invention also contemplates the insertion of a wedge midway between the plies at the root end prior to the compacting and bonding operation.

DESCRIPTION OF THE PREFERRED EMBODIMENT

Figure 1:
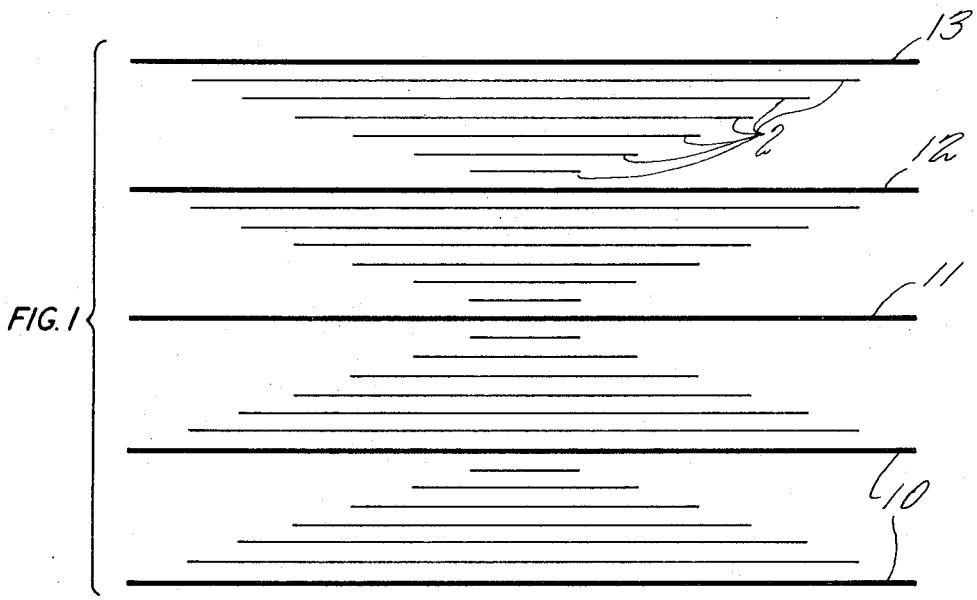
FIG. 1 is a diagrammatic arrangement of the fibers in an assembled and spaced condition to show the particular arrangement thereof.
Figure 2:
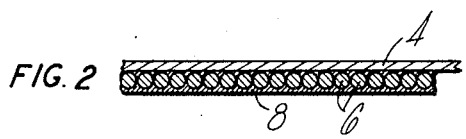
FIG. 2 is a sectional view of a fragment of one of the layers of fibers.

Referring first to FIG. 1, the blade construction is started by assemblying a plurality of layers 2 of composite fibers in a matrix in stacked relation. Each layer 2, as shown in FIG. 2 consists of a metallic backing sheet 4 which may be aluminum or an aluminum alloy, a layer of high strength fibers 6 all arranged in parallel relation to one another on the backing sheet, these fibers being essentially, for example, boron filaments, all held in position on the backing sheet by a sprayed-on metallic coating 8 such as an aluminum or aluminum alloy. The fibers are preferably fully submerged in the coating. These layers are cut to the dimension desired prior to the stacking operation.

The several layers 2 differ in dimension in order to produce the desired finished dimension of the blade and are held to one or more aluminum sheets 10 of greater thickness than the plies by separately bonding each composite layer to the aluminum sheet. Obviously, to accomplish this, the stacking must be done as best shown in FIG. 1 from a narrow ply to increasingly wider and longer plies so that it is unnecessary to have the tack welding of the plies effective between plies and each successive ply may be directly tack welded to the supporting aluminum sheet. This assemblage of plies and aluminum sheets is described and claimed in Gray, et al, Ser. No. 864,021 filed Oct. 6, 1969, now U.S. Pat. No. 3,600,103, having the same assignee as the present application.

The blade layers may be assembled up as half-sections as shown in FIG. 1 where there is a main center sheet 11 of aluminum on the opposite sides of which certain of the plies 2 are stacked and to which these plies are tack welded. There is a midsection sheet 12 to which additional plies 2 are attached and then an outer ply 13 completes the assembly. The elements on each side of the center form blade half-sections as will be apparent.

Figure 3:
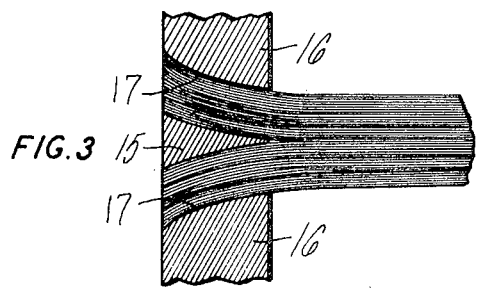
FIG. 3 is a diagrammatic showing of the blade fibers, the wedge and the root blocks in position for compacting and bonding.

After the plies are assembled as in FIG. 1, but in contact within one another as in FIG. 3 rather than spaced apart as in this diagrammatic view to form a composite blade assembly, a wedge 15 is positioned substantially midway of the assemblage of plies as against one side of the center sheet 11 at the root end to spread the plies apart at this point for a more secure root attachment. Root blocks 16 are then positioned on opposite sides of the assemblage of plies adjacent the same edge as the wedge, these blocks 16 having inner surfaces 17 shaped to conform to the finished contours of the compacted fibers positioned over the wedge. The other surfaces of the root blocks are preferably positioned in right angle relationship to one another as shown. This is particularly true where the root blocks are made of a harder material than aluminum, such as titanium, since with titanium the particular desired shape of the outer surfaces of the root blocks in forming the blade mounting is machined after the bonding and compacting operation of the present operation.

The entire assemblage of FIG. 3 is then positioned between suitable dies not shown having opposed cavities therein conforming to the finished shape of the opposed surfaces of the blade and also forming in conjunction with one another a cavity that is the complete shape of the blade with the root blocks applied thereto. Pressure and heat are then applied to the die to compact the fiber layers together and to cause the matrix surrounding the fibers to flow and fill all of the voids in the blade. With the materials described above, a temperature of 1050°F is suitable for bonding with a pressure of 3500 psi. A suitable apparatus for compacting the fibers and applying pressure to force the root blocks against the fibers is described in the copending application of Stone, Ser. No. 131,968 filed Apr. 7, 1971. The effect of this heat and pressure is to cause the matrix surrounding the fibers to flow and fill all the voids in the blade, to bond the fibers and the matrix all together into a single compact entity and to securely attach the root blocks over their entire surfaces to the fiber material.

It will be understood that the pressure exerted by the dies through the root blocks causes the inner surfaces of the root blocks to contact completely over their entire surfaces with the surface of the assemblage of fiber layers and the compaction of the fiber layers in this area is therefor caused by the action of the root blocks. In this way the surfaces of the shaped fiber layers underlying the root blocks conform completely to the inner surfaces of the root blocks and a satisfactory bond is established between the composites and the root blocks over the entire inner surfaces thereof. Similarly, the surfaces of the wedge block conform the contacting composite precisely to the entire area of the inner surfaces of the block for secure attachment thereto. This contact between the root blocks and the cooperating surfaces of the composite will be complete even though there may be minor deviations in the actual shape of these surfaces from the proper configuration, such deviations arising as a result of established tolerances in the manufacture of the root blocks.

Figure 4:
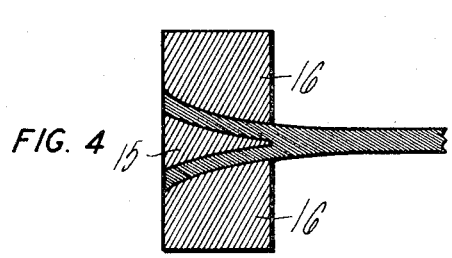
FIG. 4 is a view similar to FIG. 3 through a finished blade.

In the arrangement of FIGS. 3 and 4, the root blocks are preferably titanium or titanium alloy and require a machine finishing as above stated to form a suitable root shape thereon after removal from the dies, since titanium is not workable at the bonding temperature of about 1050°F which is the temperature at which the compacting and bonding operation takes place if the material is that above described by way of example.

Figure 5:
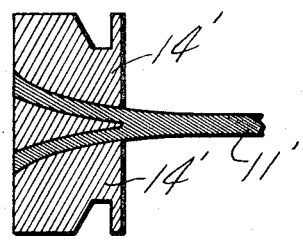
FIG. 5 is a view similar to FIG. 4 with a modification of the root blocks.

In the arrangement of FIG. 5, however, the root blocks are aluminum or aluminum alloy and this material is somewhat workable at this bonding temperature. Accordingly, the root blocks 14' of this arrangement which are placed on the assemblage of composite plies 11' are formed substantially to finished dimension as shown before the bonding operation, and during the bonding operation the pressure exerted by the dies and the temperature of the bonding operation will cause a coining action and the dies will form the root blocks to precisely the required finished dimension and shape of these blocks to make a finished blade root.

What is claimed is:
1. In the process of making a composite blade the steps of:
   assembling a plurality of layers of a composite material together forming blade half-sections,
   placing a wedge between the two blade half-sections at the root ends thereof,
   placing root blocks on opposite sides of the two blade half-sections at the root ends thereof and,
   compacting said layers of composite material and said root blocks together for bonding said blocks to the blade half-sections and simultaneously bonding the layers of the composite material together and the blade half-sections together.
2. The process of claim 1 including the steps of simultaneously bonding the wedge to the half-sections.
3. The process of claim 1 including the step of splaying the blade half-sections apart to form a wedge-shaped space and positioning a wedge in said space.
4. The process of claim 1 including the steps of positioning said blade half-sections with the wedge therein and with the blocks in position in a bonding die and heating said die to cause the bonding to take place.
5. The process of claim 1 including the step of simultaneously coining the outer surfaces of the blocks to finished dimension.
6. The process of making a composite blade with a root thereon at one end including the steps of:
   1. assembling a plurality of layers of composite fibers together forming a blade shape
   2. positioning a wedge between certain of the layers at one end to spread said layers apart,
   3. mounting root blocks on opposite sides of said assemblage of fibers at the same end of the wedge and,
   4. bonding said layers of fibers together and simultaneously bonding the wedge in position and the blocks to the outer surfaces of the outer layers of fibers.
7. The process of claim 6 with the additional step of shaping the inner surface of the blocks to conform substantially to the finished contours of the assembled layers of fibers over the wedge when said layers of fibers are compacted to finished dimension.
8. The process of claim 6 with the added steps of shaping the outer surfaces of the blocks substantially to finished dimension and,
   coining the outer surface of said blocks to finished dimension simultaneously with the bonding and compacting of the fiber layers together and the blocks and wedge thereto.

* * * * *